Inventor
Lester C. Wales
by Roberts, Cushman + Grover
Attys

April 21, 1953 L. C. WALES 2,635,594
TWO-CYCLE DIESEL ENGINE
Filed Dec. 8, 1951 3 Sheets-Sheet 3

Inventor
Lester C. Wales
by Roberts, Cushman & Grover
Attys

Patented Apr. 21, 1953

2,635,594

UNITED STATES PATENT OFFICE 2,635,594

TWO-CYCLE DIESEL ENGINE

Lester C. Wales, Winthrop, Maine

Application December 8, 1951, Serial No. 260,599

10 Claims. (Cl. 123—74)

1

This invention relates to two-cycle diesel engines and has for its principal objects improvements in design which effect economy in operation and high efficiency in power output, which adapts itself to single cylinder or multi-cylinder engines and to in-line or radial arrangement of the cylinders. Other objects are to provide for improvements in fuel injection, better scavaging of the burned gases and disposal thereof and better control of the exhaust and intake valves.

As herein illustrated, each cylinder and there may be one or as many as desired arranged in line or radially, has in it a piston operable in power and compression strokes. A fuel injector is located at the compression end of the cylinder and as the piston approaches the end of its compression stroke it actuates the injector, injecting a fresh charge of fuel into the cylinder into the highly compressed air. Ignition takes place driving the piston on its power stroke to the opposite end of the cylinder. The piston has in it check valves and the compression end of the cylinder has in it an exhaust valve. As the piston nears the end of its power stroke the air at the power side of the piston opens the valves in the pistons and the exhaust valve by way of a by-pass, permitting fresh air at the power side of the piston to sweep through the piston pushing the burned gases ahead of it out through the exhaust valve. During return movement of the piston in its compression stroke the valves are closed so that the fresh air at the compression side is trapped and compressed while a new charge of fresh air is drawn through the intake valve at the power end of the cylinder. The injector is mounted at the compression end of the cylinder and has in it a compression chamber into which air is forced by the compression stroke. A plunger is movable into the chamber and is operable by the piston near the end of the compression stroke to trap and compress the air in the compression chamber. The plunger has a ported passage through it and upon movement of the plunger into the chamber one of the ports is placed in communication with the chamber and with a fuel inlet so that air trapped in the chamber is projected through the opening into the cylinder and carries with it a charge of fuel. Each cylinder has formed at one end a bearing member for supporting the cylinder for oscillation about that end on a fixed support, the latter consisting of a fixed shaft on which is mounted a bearing shaft. The bearing shaft is hollow in part and provides a common exhaust duct for the cylinders mounted thereon through

2 which the exhaust gases from the various cylinders may be exhausted, suitable conduits being provided for joining each cylinder to the exhaust passage.

The invention will now be described in greater detail with reference to the accompanying drawings wherein:

Fig. 6 is a vertical section to larger scale of the fuel injector.

Figure 1:
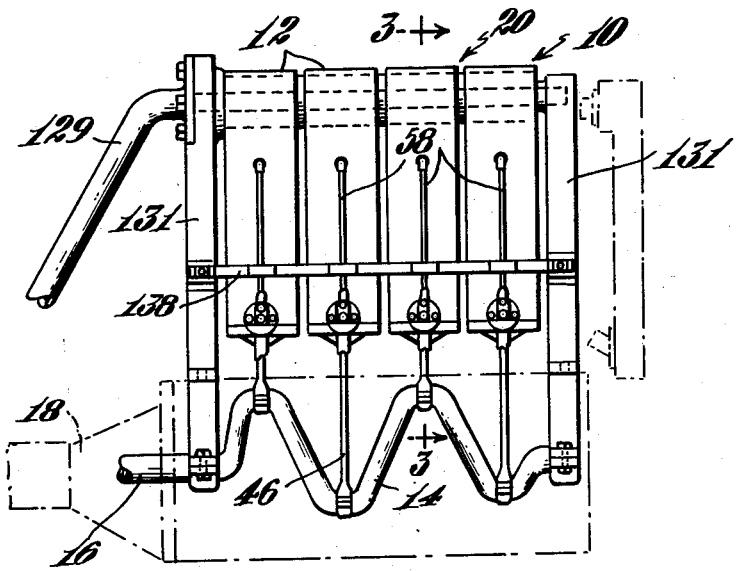
Fig. 1 is a side elevation of a multi-cylinder engine wherein the cylinders are arranged in-line.
Figure 2:
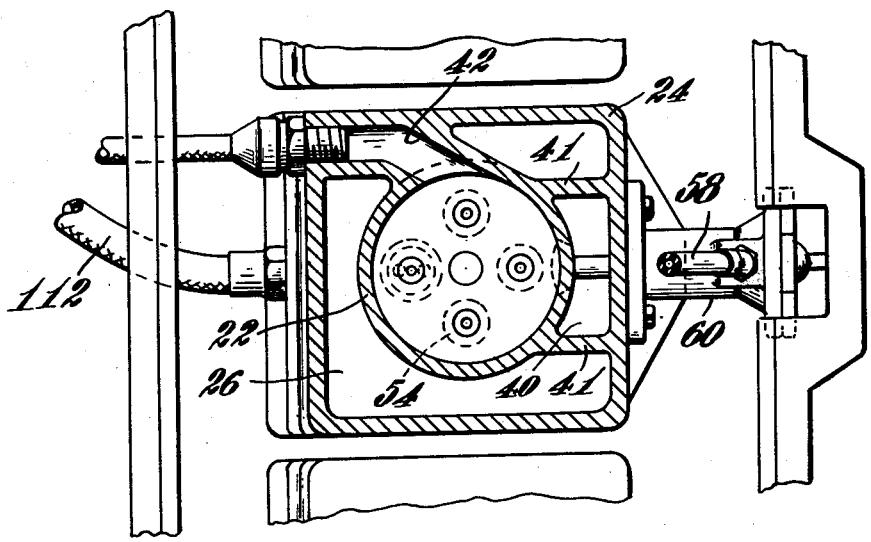
Fig. 2 is a transverse section to larger scale through one of the cylinders taken on the line 2—2 of Fig. 3.

Referring to the drawings (Fig. 1) there is shown a multi-cylinder engine 10 in which there are for the purpose of illustration four cylinder blocks 12 in-line, each of which has a piston and piston rod, the details of which are to be described hereinafter, connected to a crank shaft 14 which in turn is connected to a drive shaft 16 by way of a suitable clutch shown in phantom at 18. The cylinder blocks 12 in accordance with this invention and as will be described more specifically hereinafter are mounted for individual oscillation on a common bearing shaft 20.

Figure 3:
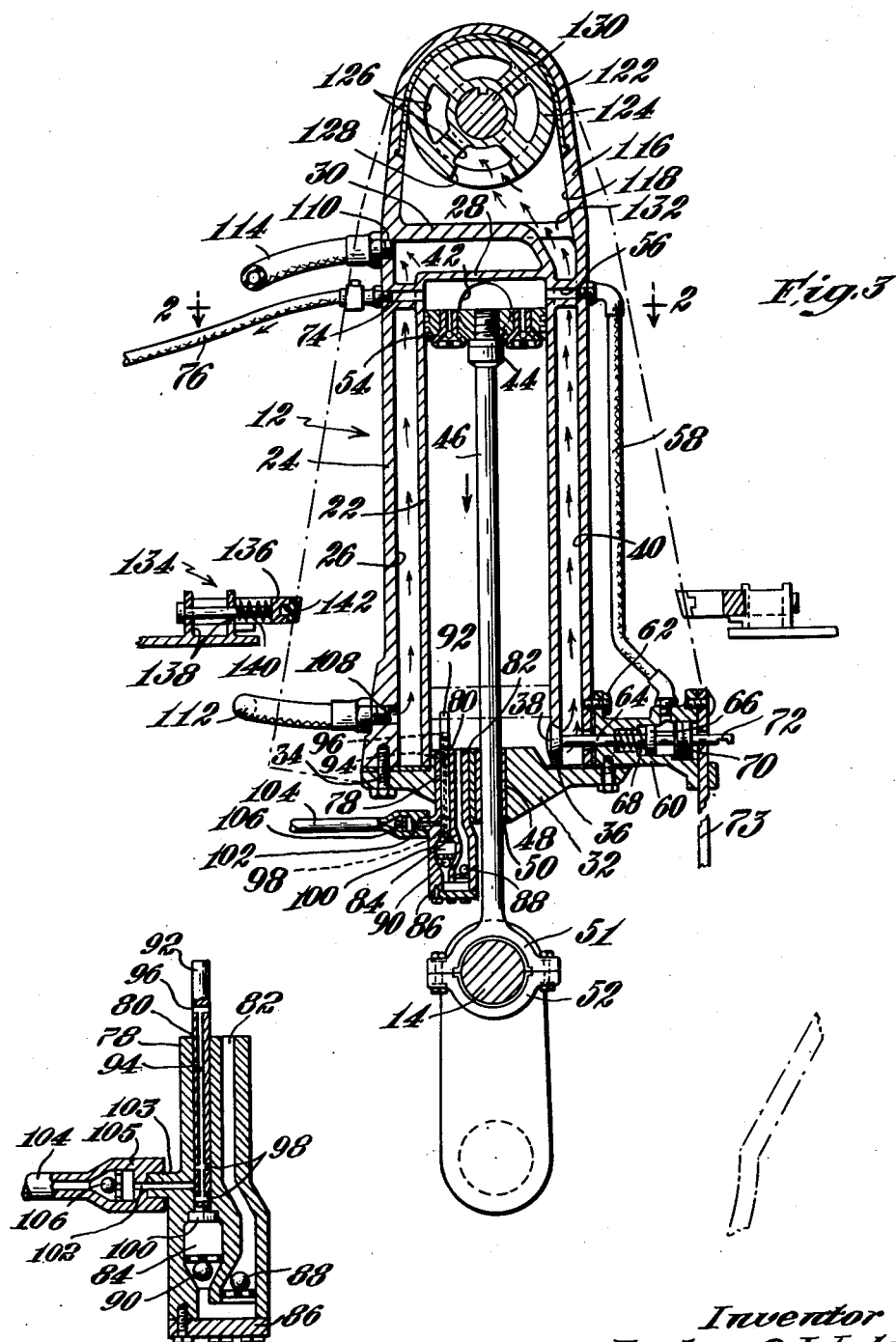
Fig. 3 is a vertical section through one of the cylinders taken on the line 3—3 of Fig. 1.

Each cylinder block 12 as illustrated in Fig. 3, has a cylinder 22 surrounded by a jacket 24 thereby providing an annular chamber 26 for a cooling fluid such as water. The upper end of the cylinder 32 is closed by a wall 28 and the upper end of the jacket 24 by a wall 20. An end member or bearing block 32 is bolted to the opposite ends of the cylinder and jacket so as to close the same, the wall of the jacket being thickened at its lower end to receive bolts 34 for fastening the bearing block in place.

The cylinder block has at its lower compression end in the cylinder wall 22 an exhaust port 36 in which there is seated an exhaust valve 38. The exhaust port 36 is in direct communication with an exhaust passage 40 between the cylinder and jacket which is divided from the chamber 26 by suitable partitions 41 cast integral with the cylinder and jacket. The passage 40 extends from the lower end of the cylinder block upwardly to its opposite or power end. At the power end of the cylinder block there is an intake valve port 42 in which there is a conventional intake valve not shown for admitting fresh air to the cylinder during the compression stroke. Within the cylinder 22 there is a piston 44 fastened to one end of a piston rod 46, the opposite end of which passes through a hole 48 in the bearing block 32. The hole 48 is lined with a bearing sleeve 50 so as to provide a smooth sliding fit which is substantially gas tight. The end of the piston rod is joined by bearing yolk 51 and cap 52 to the crank shaft. The piston 44 has in it check valves 54 which will close on the compression stroke as the piston moves downwardly within the cylinder, will remain closed during the greater part of the power stroke following ignition and expansion of the fuel but will open at or near the end of the power stroke to admit a charge of fresh air through them to the compression side of the piston for the purpose of scavaging the cylinder. In order to open the exhaust valve 38 during the scavaging operation and hence to permit the burned gases to pass from the exhaust passage 40, a port 56 is formed at the power end of the cylinder through its wall and the wall of the jacket and is connected by conduit 58 to an air cylinder 60 fastened to the lower or compression end of the cylinder by bolts 62 opposite the exhaust valve. The exhaust valve has a valve rod 64 fast to it which extends from the cylinder into the air cylinder and has on it a piston 66. A spring 68 seated in the chamber behind the piston 66 normally holds the exhaust valve closed, however, the latter will open when sufficient air pressure is admitted to the opposite side of the piston 66 by way of the by-pass 58. A gland 70 is threaded into the open end of the air cylinder 60 and a portion of the valve stem 64 passes therethrough and has at its end a notch 72. A latch member 73 is cooperable with the notch 72 to hold the valve 38 open during starting operations.

As thus illustrated during the power stroke the air at the power side of the piston is forced through the conductor 58 and opens the exhaust valve 38 substantially simultaneously with the opening of the valves 54 in the piston thereby permitting the inrush of fresh air to force the burned gases out through the exhaust port 36 and through the passage 40.

The upper end of the cylinder 22 is also provided with a port 74 to which there is connected a conduit 76 for delivering air under pressure to the fuel supply not shown and hence to keep the fuel supply under a moderate pressure at all times.

The fuel is injected at the lower end of the cylinder through the end member 32 and to this end there is provided an injector housing 78. The housing 78 has two passages 80 and 82 therein, one end of each of which opens into the lower end of the cylinder and the opposite end of which is connected to a compression chamber 84. A removable plate 86 is fastened to the lower end of the housing to permit easy access to the injector for cleaning when necessary. A pair of check valves 88 and 90 are interposed in the passage 82 and will allow air under pressure to enter from the cylinder through the passage 82 to the chamber 84 but will prevent back pressure. A plunger rod 92 is slidably mounted in the passage 80 and has through it a longitudinal passage 94 ported near its opposite ends at 96 and 98. The upper end of the plunger extends upwardly into the cylinder a sufficient distance to be engaged by the descending piston near the end of its compression stroke so as to displace it downwardly into the chamber 84. The lower end of the plunger has a head 100 which seats in the lower end of the passage 80 when it enters the chamber 84. In one side of the housing there is a port 102 connected by a nipple 103, coupling 105 and fuel line 104 to the fuel supply. A check valve 106 in the coupling 105 permits flow of fuel into the passage 80 but prevents back pressure on the fuel supply. The ports 98 are so located with respect to the fuel port 102 that when the plunger is depressed thereby unseating the head 100, the ports 98 will be in communication with the chamber 84 and with the port 102 at the same time. As thus constructed the injector operates as follows. As the piston 44 descends on its compression stroke air is forced through the passage 82 and by the valves 88 and 90 into the compression chamber 84. During the latter part of the downward movement of the piston 44 it engages the plunger 92 forcing its end 100 downwardly into the chamber 84 thus immediately closing the valves 88 and 90 and trapping a small amount of air therein which it then compresses due to entrance of the plunger into the compression chamber to a higher pressure than that within the cylinder 22. As the plunger rod moves downwardly its lower port 98 simultaneously opens the passage 94 to the chamber 84 and to the fuel port 102 with the result that the highly compressed air in the chamber is injected through the passage and carries with it a charge of fuel, so that the latter is projected into the highly compressed high temperature air at the lower end of the cylinder between the piston and the bottom of the cylinder. Ignition takes place immediately and the expanding gases drive the piston upwardly in its power stroke. Near the upper end of its power stroke the air at the power side of the piston, that is between it and the upper end of the cylinder is gradually compressed until it exceeds the pressure of the expanding gases on the compression side of the cylinder. When this takes place, approximately ⅚ of the travel of the piston, the air at the power side of the piston, that is the top side of the piston as seen in Fig. 3, forces the valves 54 in the piston open and at the same time operates by way of the by-pass 58 on the piston 66 so as to open the exhaust valve 38. The compressed air at the power side of the piston immediately rushes through the valves 54 sweeping ahead of it the burned gases and pushes them through the exhaust port into the exhaust passage 40. As the piston 44 begins to descend the pressure below or at the compression side thereof begins to build up thus closing the valves 54. The pressure at the opposite side falls allowing the exhaust valve 38 to close under the influence of the spring 68 and compression of a fresh charge of air takes place as the piston continues to the bottom end of the cylinder accompanied by an inflow of fresh air through the intake valve 42 at the upper end of the cylinder. When the piston reaches the bottom of the cylinder, ignition takes place again as related above and the cycle once more is initiated.

Ports 108 and 110 are provided at opposite ends of the jacket and have connected thereto flexible conduits 112 and 114 for suitable circulation of cooling water through the jacket.

Each cylinder is individually supported for oscillation about a bearing member 20 and to this end has made fast to its upper end or cast integral therewith a bearing member 116 (Fig. 1) which forms with the upper wall 30 of the jacket a chamber 118, the opposite ends of which have openings 120 therein. The inner surface of the bearing 116 is lined with a suitable wear resistant bearing material 122. The bearing member 20 consists of a shaft 124 having hollow portions 126 extending lengthwise thereof, one of which is ported at 128 so as to be opened into the chamber 118. The bearing shaft 124 passes through the openings 120 in the bearing member 116 and itself is made fast to a rigid shaft 130. A port 132 is formed in the wall 30 of the jacket for connecting the exhaust passage 40 to the chamber 118 and hence to allow exhaust gases to pass through the port 128 and passage 126 to one end of the bearing shaft where it is conducted away through an exhaust pipe 129 connected to that end. The shaft 130 is fastened at its opposite ends to spaced rigid A-frames 131, the lower ends of which are bolted to the chassis of the vehicle if it is to be used with a vehicle or to a base if it is to be used as a stationary engine.

The cylinder blocks 12 oscillate from side to side on the bearing support and in order to cushion their oscillation so as to not to impart too great a strain to the crank shaft as they change their direction of motion at the end of each oscillation, bumpers 134 are provided. The bumpers 134 consist of a pair of parallel bars 138 made fast to the A-frames running along opposite sides of the cylinders. Opposite each cylinder there is placed a bumper block 136 which is fastened to a rod slidable in the bars 138 in the plane of the oscillation of the cylinder. A spring 140 normally holds the bumper block inwardly of the bars 138 so that contact of the cylinder in its swinging movement with the bumper compresses the spring 140 and thus cushions its movement. Rubber blocks 14 are fastened to the bumper block to further soften the shock.

While the engine herein illustrated shows a straight line arrangement of the cylinders, it is within the scope of this invention to arrange the cylinders circularly in radial fashion, for example, such as used sometimes in airplane design.

Figure 4:
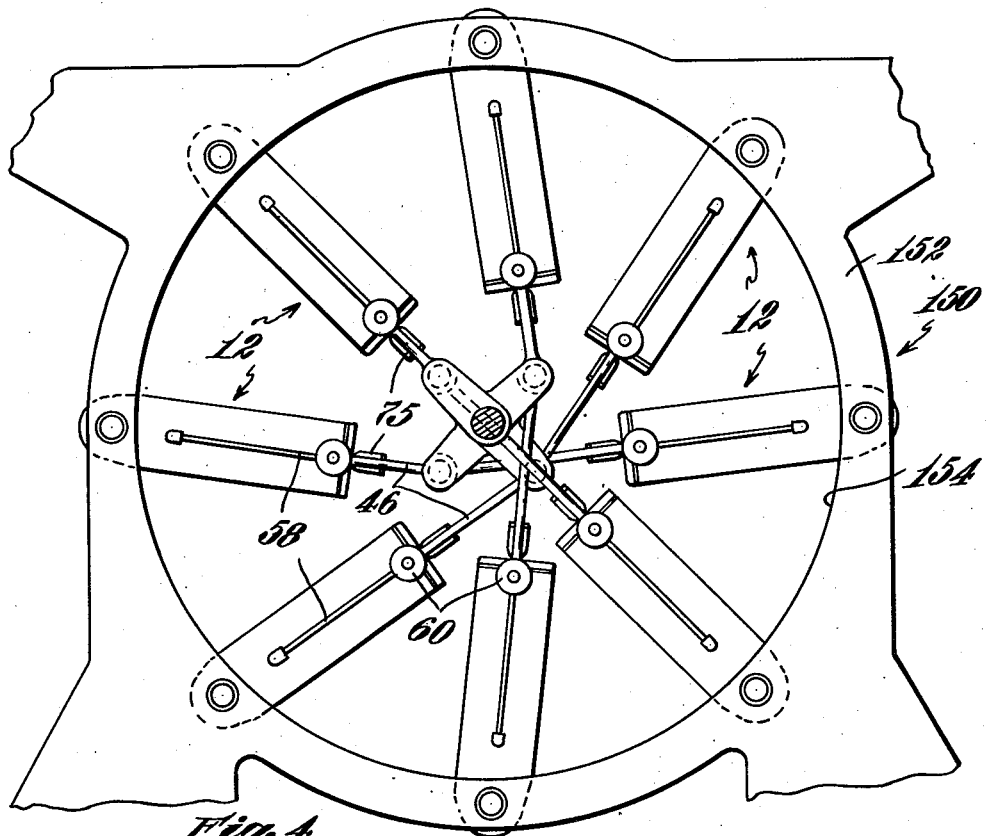
Fig. 4 is an elevation of an engine wherein the cylinders are arranged radially.
Figure 5:
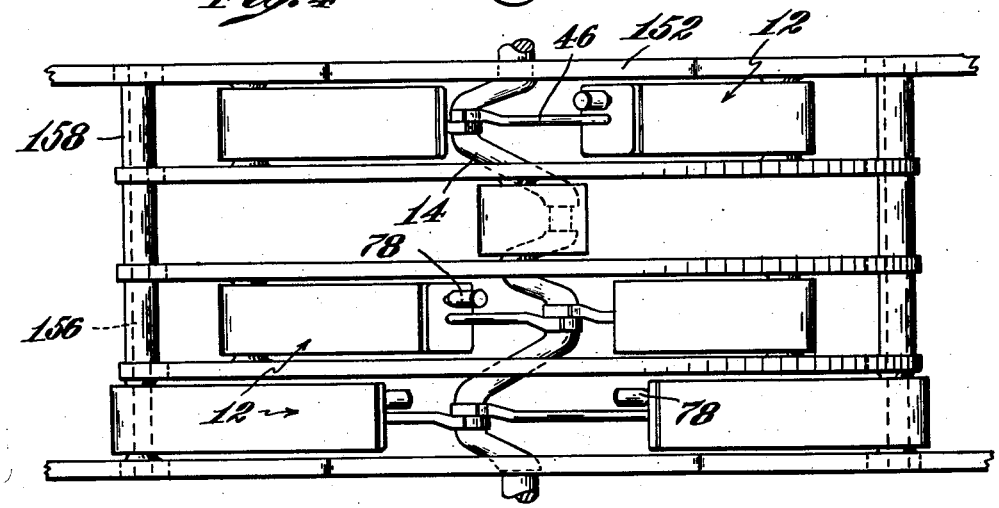
Fig. 5 is a plan view of the engine shown in Fig. 4.

Figs. 4 and 5 show the arrangement of the cylinder blocks 12 in radial fashion. As illustrated a rigid frame 150 is provided consisting of spaced parallel frame plates 152 having circular openings 154 therein, the plates being tied together peripherally of the openings 154 by means of bearing members consisting of bearing shafts 156 and bearing sleeves 158 as described with reference to the in-line engine, there being one for each cylinder as herein illustrated. The cylinder blocks 12 are provided with bearing straps as heretofore described, are pivotally mounted on the bearing sleeves 158 so as to project inwardly toward the center of the frame and their piston rods 46 and are connected at the center to the crank shaft which is suitably journaled in the frame. As shown in Fig. 5, the piston rods of two diametrically arranged cylinders are attached to a single throw of the crank shaft. Since the cylinder block and cylinders are identical with those described heretofore, their construction and operation will not be repeated with reference to this radial arrangement of the cylinders.

In the radial arrangement illustrated the cylinders do not all line a single plane, however, it is apparent that by proper design the cylinders could be compressed into a single plane so as to provide a very compact engine unit as is commonly used in plane design.

It should be understood that the present disclosure is for the purpose of illustration only and that this invention includes all modifications and equivalents which fall within the scope of the appended claims.

I claim:

1. In a two-cycle diesel engine a cylinder, a piston movable in power and compression strokes, means operable near the end of the compression stroke to inject a charge of fuel, valves in the piston operable near the end of the power stroke to permit air at the power side of the piston to pass through to the compression side, an exhaust valve at the compression end of the cylinder, other means operable by the air at the power side of the piston to open the exhaust valve substantially simultaneously with the opening of the valves in the piston to permit scavenging of the burned gases at the compression side of the piston ahead of the air entering the compression side of the piston through the piston valves and a spring for closing the exhaust valve at a predetermined time during the compression stroke.

2. In a two-cycle diesel engine a cylinder, a piston movable in said cylinder in power and compression strokes, means operable near the end of the compression stroke to inject a charge of fuel into the cylinder, valves in the piston operable near the end of the power stroke to permit air at the power side of the piston to pass therethrough to the compression side, an exhaust valve at the exhaust end of the cylinder, other means operable by the air at the power side of the piston to open the exhaust valve to permit scavenging of the burned gases at the compression side of the piston ahead of the air passing through the piston valves to the compression side of the piston, a spring for closing the exhaust valve at a predetermined time in the compression stroke and an intake valve at the power end of the cylinder operable during the compression stroke to admit fresh air to the cylinder.

3. In a two-cycle diesel engine a cylinder having exhaust and intake ends, a piston movable in the cylinder in power and compression strokes, said power stroke taking place as the piston moves toward the intake end of the cylinder and said compression stroke taking place as the piston moves toward the exhaust end of the cylinder, means at the exhaust end of the cylinder operable by the piston near the end of its compression stroke to inject a charge of fuel into the cylinder, valves in the piston operable near the end of the power stroke to permit air at the power side of the piston to pass therethrough to the compression side, an exhaust valve at the exhaust end of the cylinder, other means operable by the air at the power side of the piston to open the exhaust valve to permit scavenging of the burned gases at the compression side of the piston ahead of the air passing through the piston to the compression side thereof, a spring for closing the exhaust valve at a predetermined time in the compression stroke and an intake valve at the intake end of the cylinder operable during the compression stroke to admit fresh air to the intake end of the cylinder.

4. In a two-cycle diesel engine according to claim 1, a fuel injector at the compression end of the cylinder, said injector comprising a valve housing having a compression chamber therein, a passage leading from the inside of the cylinder to the compression chamber, a check valve at the junction of the passage and the compression chamber operable to admit air from the compression end of the cylinder through the passage to the compression chamber, a second passage in the housing extending from the inside of the cylinder to the compression chamber, a plunger rod slidable in the passage, one end of said plunger rod projecting upwardly into the cylinder and the other end terminating at the junction of the second passage and chamber, an axial passage in the plunger rod having cylinder and chamber ports near its opposite ends and a fuel supply port opening into said second passage, said fuel port being normally out of registry with the chamber port in said plunger, said plunger being depressible by the piston during the last part of the compression stroke to move the plunger chamber port into registry with the fuel port and the interior of said compression chamber.

5. In a two-cycle diesel engine according to claim 1, a fuel injector at the compression end of the cylinder, said injector comprising a valve housing having a compression chamber therein and having two passages entering the housing from the inside of the compression end of the cylinder, said passages terminating in different parts of the compression chamber, a check valve at the junction of one passage and the chamber, a plunger slidable in the other passage, said plunger having one end projecting into the cylinder and its other end in the chamber, said plunger having an axial passage lengthwise thereof with cylinder and chamber ports near its ends, a fuel inlet port through the housing communicating with said other passage, said chamber port being normally located out of registry with the fuel inlet port but being movable into registry with the inlet port and with compression chamber by depression of the plunger.

6. A two-cycle diesel engine according to claim 1, wherein there is an air cylinder fast to the diesel cylinder, the exhaust valve has a stem projecting into the air cylinder, there is a piston on the valve stem and there is a by-pass from the power end of the diesel cylinder to the air cylinder for conducting air under pressure to the air cylinder to effect operation of the exhaust valve.

7. A two-cycle diesel engine according to claim 1, wherein there is an air cylinder fast to the diesel cylinder, the exhaust valve has a stem projecting into the air cylinder, there is a piston on the valve stem, there is a by-pass from the power end of the diesel cylinder to the air cylinder for conducting air under pressure from the diesel cylinder to the air cylinder to effect operation of the exhaust valve and wherein there is a latch for holding the exhaust valve open in opposition to its closing spring.

8. A two-cycle diesel engine comprising a cylinder mounted near one end for angular oscillation about a fixed axis, a piston movable in the cylinder in power and compression strokes from the exhaust end to the intake end, means near the end of the compression stroke to inject a charge of fuel, valves in the piston operable near the end of the power stroke to permit air at the power side of the piston to pass through the piston to the compression side, an exhaust valve at the compression end of the cylinder, other means operable by the air at the power side of the piston to open the exhaust valve to permit scavenging of the burned gases at the compression side of the piston ahead of the air entering the compression side of the piston through the piston valves and a spring for closing the exhaust valve at a predetermined time during the compression stroke.

9. A two-cycle diesel engine according to claim 8, wherein the cylinder is closed at both ends, and a piston rod is connected at one end to the piston, passes through the end of the cylinder remote from said one end and is connected at its opposite end to a crank.

10. A two-cycle diesel engine according to claim 8, wherein the cylinder has a bearing member at one end, there is a fixed journal extending through the bearing about the longitudinal axis of which the cylinder is free to oscillate said journal having a longitudinal passage therein and a port, and there is an exhaust duct connected at one end to the port in said journal and at its opposite end to the exhaust end of the cylinder by way of the exhaust valve.

LESTER C. WALES.

References Cited in the file of this patent

UNITED STATES PATENTS

| Number | Name | Date |
|---|---|---|
| 1,029,419 | Burtnett | June 11, 1912 |
| 1,341,367 | Gruss | May 25, 1920 |

FOREIGN PATENTS

| Number | Country | Date |
|---|---|---|
| 275,497 | Great Britain | Aug. 11, 1927 |